United States Patent [19]

Reynolds

[11] Patent Number: 5,781,231
[45] Date of Patent: Jul. 14, 1998

[54] REAL-TIME PARAMETER ADJUSTMENT OF DIGITALLY SYNTHESIZED VIDEO TEST SIGNALS

[75] Inventor: John C. Reynolds, Beaverton, Oreg.

[73] Assignee: Tektronix, Inc., Wilsonville, Oreg.

[21] Appl. No.: 589,696

[22] Filed: Jan. 22, 1996

[51] Int. Cl.⁶ .................................................. H04N 17/02
[52] U.S. Cl. ............................................................ 348/181
[58] Field of Search .................................... 324/523, 527,
324/528, 770; 348/175, 176, 177, 180,
181–183, 184, 194; 364/159; 371/27.1,
27.6; 455/67.1, 674; H04N 17/02, 17/04,
17/06

[56] References Cited

U.S. PATENT DOCUMENTS

| | | | |
|---|---|---|---|
| 4,635,096 | 1/1987 | Morgan | 348/181 |
| 4,974,080 | 11/1990 | Fritchie et al. | 348/181 |
| 5,136,368 | 8/1992 | Fairburst | 348/177 |

Primary Examiner—John K. Peng
Assistant Examiner—Nathan J. Flynn
Attorney, Agent, or Firm—Francis I. Gray

[57] ABSTRACT

A digital test signal generator that provides for real-time parameter adjustment of digitally synthesized video test signals has a pair of test signal memories coupled one at a time via address and data multiplexers to a test signal synthesizer. Also coupled to the pair of test signal memories via the address and data multiplexers is a processor. The processor is coupled to one memory while the test signal synthesizer is coupled to the other. When a user changes a parameter at a front panel, the processor loads the one memory with new data representing the selected video test signal as modified by the parameter change. The processor than toggles the address and data multiplexers so that the one memory is coupled to the test signal synthesizer to generate the modified video test signal according to the changed parameter while the other memory is coupled to the processor ready to be loaded with data according to a next parameter change.

2 Claims, 1 Drawing Sheet

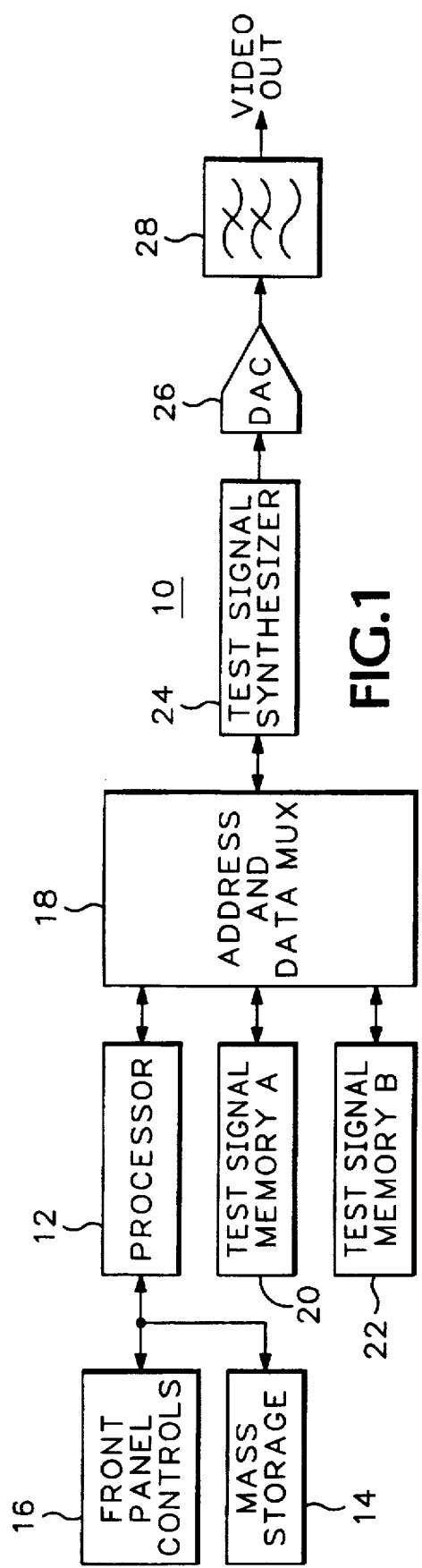
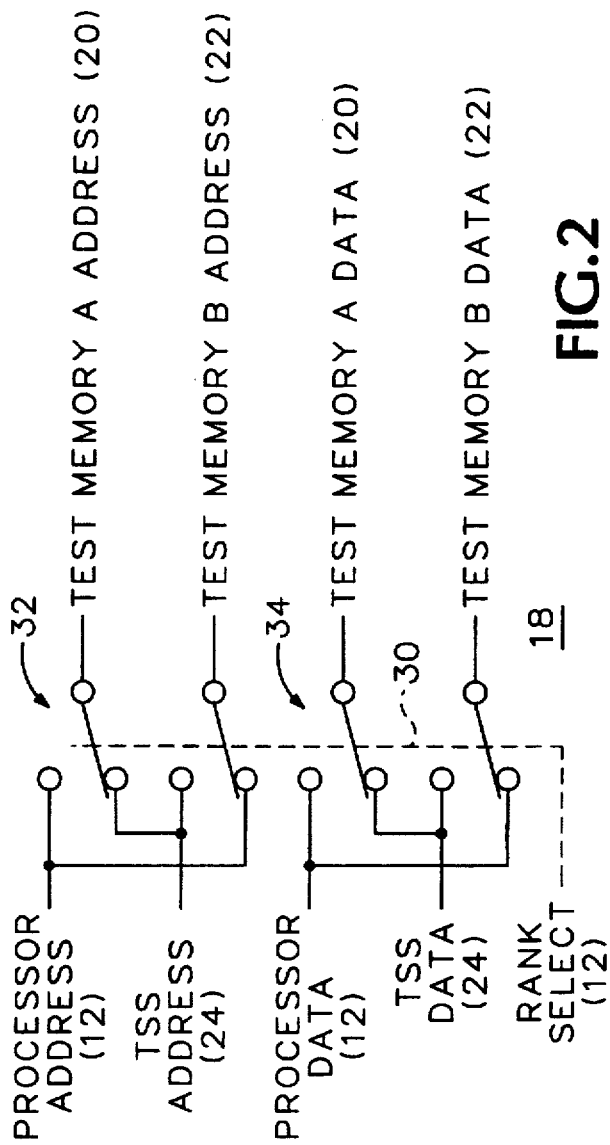

REAL-TIME PARAMETER ADJUSTMENT OF DIGITALLY SYNTHESIZED VIDEO TEST SIGNALS

BACKGROUND OF THE INVENTION

The present invention relates to test signal generators, and more particularly to an apparatus and method for real-time parameter adjustment of digitally synthesized video test signals to provide flexibility in the generation of the test signals.

Prior video test signal generators, such as the Tektronix 1410/1411 Test Signal Generators, manufactured by Tektronix, Inc. of Beaverton, Oreg., United States of America, produced television test signals through the use of analog circuitry. Each element of the test signal, such as luminance, subcarrier and sync, was generated with a dedicated piece of circuitry. These elements were then combined to produce the video test signal. With this method of producing video test signals, the various parameters of the test signal elements, such as gain, offset and phase, were determined by values of resistors and capacitors. Since many users found it useful to alter these test signal parameters from their nominal values, front panel controls were provided to vary the values of the resistors and capacitors for this purpose.

Later video test signal generators, such as the Tektronix 1910, TSG 170 and TSG 271 Digital Generators, used digital signal synthesis. While offering many advantages over the older analog techniques, digitally synthesized video test signal generators have not provided the flexibility afforded by the older analog generators in the realm of real-time parameter adjustments.

What is desired is a means for providing real-time parameter adjustments of digitally synthesized television test signals.

SUMMARY OF THE INVENTION

Accordingly the present invention provides an apparatus and method for real-time parameter adjustment of digitally synthesized video test signals by switching between a pair of test signal memories. A mass storage device contains a plurality of video test signal patterns. These patterns together with operator inputs from a front panel are input to a processor. The pair of test memories and the processor interact via address and data multiplexers. The output from the address and data multiplexers is the desired test signal pattern which is converted to an output video test signal by a test signal synthesizer. New test signal patterns are loaded by the processor into the test signal memory not currently providing input to the test signal synthesizer, and the memories are switched by the address and data multiplexers in response to a toggle command so that the test signal memory with the new test signal pattern is connected to the test signal synthesizer while the other memory is connected to the processor.

The objects, advantages and other novel features of the present invention are apparent from the following detailed description when read in conjunction with the appended claims and attached drawing.

BRIEF DESCRIPTION OF THE DRAWING

FIG. 1 is a block diagram view of a test signal generator that provides for real-time parameter adjustment of digitally synthesized video test signals according to the present invention.

FIG. 2 is a simplified block diagram view of address and data multiplexers for the test signal generator of FIG. 1 according to the present invention.

DESCRIPTION OF THE PREFERRED EMBODIMENT

Referring now to FIG. 1 a test signal generator 10 is shown having a processor 12 coupled to interact with a mass storage device 14, front panel controls 16 and address and data multiplexers 18. Also coupled to the address and data multiplexers 18 are two ranks of memory 20, 22, labeled "Test Signal Memory A" and "Test Signal Memory B". At the output of the address and data multiplexers 18 is a test signal synthesizer 24, such as that described in U.S. Pat. No. 5,001,549 issued Mar. 19, 1991 to Dennis Holmbo et al entitled "Television Signal Generator". The test signal synthesizer 24 outputs a digital test signal that is processed by digital-to-analog converter (DAC) 26 and a reconstruction (lowpass) filter 28 to provide a desired video test signal output.

The test signal synthesizer 24 uses the data pattern stored in the test signal memories 20, 22 to produce video test signals in real-time. The address and data multiplexers 18 operate in a manner shown in FIG. 2. When the address and data signals associated with test signal memory A 20 are connected to the test signal synthesizer (TSS) 24, the address and data signals associated with test signal memory B 22 are connected to the processor 12. Similarly when the address and data signals associated with test signal memory B 22 are connected to the TSS 24 via the address and data multiplexers 18, the address and data signals associated with test signal memory A 20 are connected to the processor 12. Toggling a Rank Select control line 30 exchanges the connections between the two test signal memories 20, 22 by toggling between the two positions of address and data switches 32, 34.

In operation a user selects a video test signal by actuating the front panel controls 16. This causes the processor 12 to access the appropriate blocks of data from the mass storage device 14 that represent the pattern for the selected test signal. The processor 12 then loads the test signal memory A 20 with this data which in turn is used by the TSS 24 to generate the selected video test signal. When the user moves a front panel parameter control to adjust a signal parameter for the selected test signal, such as video amplitude, the processor 12 calculates the data values necessary to produce the test signal with the new parameter value, loads them into test signal memory B 22, and toggles the Rank Select control line 30 synchronous with a system clock signal. The TSS 24 then is coupled to the test test signal memory B 22 and generates a new version of the selected test signal based on the new parameter value.

As a result the test signal generator 10 provides the flexibility of variable signal parameter adjustment afforded previously by analog-based signal generators with the accuracy and repeatability provided by digital signal synthesis techniques. It is also feasible to directly emulate the variable parameter circuit elements of analog-based video test signal generators with dedicated hardware. However by performing the data value modifications with a general purpose processor 12 the expense of dedicated high-speed digital processing hardware is avoided. Finally since this technique includes the general purpose processor 12, new programs may be written to allow real-time alterations of test signal parameters yet undefined. This is especially important in a research environment where test signals are being defined for new video standards and formats.

Thus the present invention provides a digital test signal generator having real-time parameter adjustment capability by using a general purpose processor and a pair of test signal memories coupled via address and data multiplexers to a test signal synthesizer, by generating a test signal from one memory via the test signal synthesizer while loading the other memory with data values reflecting a new parameter value, and by switching between the memories to couple the memory with the new data values to the test signal synthesizer.

What is claimed is:

1. A test signal generator of the type that digitally synthesizes a test signal from data contained in a memory further comprising:

first and second test signal memories;

a test signal synthesizer for digitally generating the test signal from data contained in one of the first and second test signal memories at a time;

a processor;

means for selectively coupling the processor and test signal synthesizer to the first and second test signal memories; and means coupled to the processor for varying parameters of the test signal so that, while the first test signal memory is coupled to the test signal synthesizer by the coupling means, the processor loads the second test signal memory with data representing the test signal with the varying parameters and causes the coupling means to switch the second test signal memory to the test signal synthesizer in lieu of the first test signal memory.

2. A method of real-time parameter adjustment of digitally synthesized video test signals comprising the steps of:

storing data for a selected video test signal in a first test signal memory;

coupling the first test signal memory to a test signal synthesizer for digitally generating the selected video test signal;

loading a second test signal memory coupled with modified data for the selected video test signal according to input parameter changes from a processor coupled to the second test signal memory; and toggling the coupling of the first and second memories so that the second memory is coupled to the test signal synthesizer and the first memory is coupled to the processor.

* * * * *